L. S. LACHMAN.
COMPOSITE METAL WORK.
APPLICATION FILED NOV. 26, 1913.
1,111,393.
Patented Sept. 22, 1914.
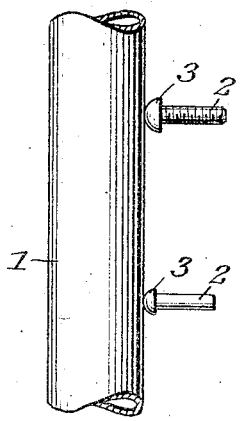
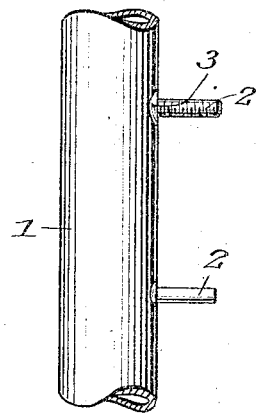
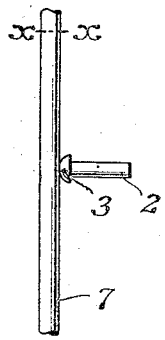
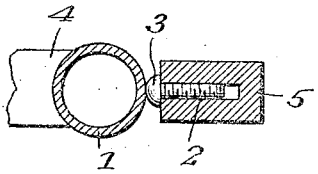
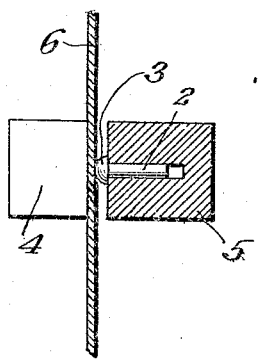
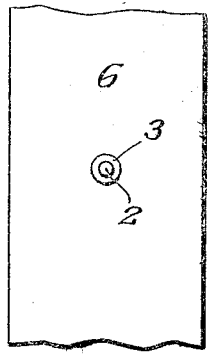
WITNESSES
F. B. Townsend
Henry A. Kind
INVENTOR
Laurence S. Lachman
BY
Townsend & Decker
ATTORNEYS

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

COMPOSITE METAL-WORK.

1,111,393.      Specification of Letters Patent.      Patented Sept. 22, 1914.

Original application filed June 16, 1910, Serial No. 567,152. Divided and this application filed November 26, 1913. Serial No. 803,123.

*To all whom it may concern:*

Be it known that I, LAURENCE S. LACHMAN, a citizen of the United States, and a resident of New York, in the county of New York and State of New York, have invented certain new and useful Improvements in Composite Metal-Work, of which the following is a specification.

My present invention relates to composite metal work and more particularly to those forms in which one of the members projects in a lateral direction from the other member.

The main object of the invention is to simplify and cheapen the cost of manufacture of metal work wherein it is desired to provide a pin, screw or similar device projecting in a lateral direction from the member to which it is secured. To effect this result the parts are preferably electrically welded to each other and to assist in this operation as well as to attain a commercial, practical article the projecting pin or screw is of a specific type having a rounded or curved head united to a shank of smaller diameter by a substantially square shoulder.

The invention consists in the new and novel composite metal work secured together in the manner hereinafter more particularly described and then specified in the claims.

In the accompanying drawings, Figure 1 is a side elevation of a device showing members in position previous to welding in accordance with this invention. Fig. 2 is a plan and partial section of the parts shown in Fig. 1 before welding. Fig. 3 is a side elevation of the device shown in Fig. 1 after welding the parts together. Fig. 4 illustrates a modified form of work, the parts being held between suitable clamping electrodes. Fig. 5 is a front elevation of the work illustrated in Fig. 4. Fig. 6 illustrates a modification in the form of the members to be joined and Fig. 7 is a horizontal section through the same on the line X X.

To illustrate my present invention, it is shown as applied to joining pieces of metal of various shapes and forms but it will be understood that the invention as set out in the appended claims is not limited to the particular forms of the parts shown but is equally applicable to numerous other forms in which it is desired to have one member project in a lateral direction from the other.

The invention is particularly useful in metal structures wherein it is desired to provide one member of a structure with means whereby another member or part can be secured to it, skeleton metallic baby carriages being an instance of this use, in which case the framework consists mainly of tubes or rods fastened to each other and to the body.

The invention contemplates providing a tube, rod or other part with a screw, rivet, or the like whereby another part can be fastened to the tube or rod by the screw, rivet, &c., although other uses to which the invention might be put will be evident and within the scope of the appended claims.

Referring to the drawings Figs. 1, 2 and 3, 1 indicates a tubular length of metal to which the pins 2 are to be secured. The pins 2 might be of any desired character such as a screw, rivet, split pin or any other form of fastening device or rod which it is desired to secure to the part 1 in a general lateral projecting direction. The pins 2 are provided with a head 3 of larger diameter than the body portion of the pins, the heads having a rounded or convex surface at the apex and a substantially square shoulder at the junction of the head and the body of the pin.

The pin is placed against the member or part 1 in such position that the rounded surface of the head 3 butts against the side or periphery of the part 1 and the pin 2 projects in a general lateral direction therefrom.

The parts are assembled between suitable current carrying electrodes of any suitable kind whereby the parts may be joined together by the employment of the electric welding process now well known in the art. One manner of so joining them is illustrated in Fig. 2 in which 4 indicates one of the electrodes adapted to engage the outer periphery of the tubular member 1 in a line with the pin 2. The other electrode, indicated at 5, is preferably bored out to permit the insertion of the body of the pin 2, the shoulder at the head seating on the outer surface of the electrode, one of the objects of the shoulder being that it affords an abutment against which the electrode presses when applying the welding pressure necessary to complete the welding operation and thus expensive and troublesome clamping devices to grip the periphery of the pin are avoided.

As is now well known to those skilled in the electric metal working art, the electric current passes from the one electrode to the other and softens the work at the junction of the two parts and by simultaneously applying pressure thereto the parts become integrally united. As the current flows from one part to the other and pressure is applied the head 3 coalesces with the metal of the member 1, the attendant bur caused by the upsetting pressure being taken up in the space between the rounded head and the surface of the member 1, whereby, when the welding operation is finished, a clean bearing surface is left at the shoulder of the head, whereby the necessity of using any finishing tool to remove the bur is avoided. This is important as often the necessity of removing the bur after welding makes the use of the electric welding process prohibitive. By providing the pin with a rounded surface a restricted area of contact is attained with the opposite part, whereby initial contact of small area to readily start the heating is provided.

As shown in Fig. 3, the upsetting pressure is continued until the shoulder on the pin comes into alinement with the vertical line of the surface of the member 1, but obviously, if desired, the welding operation might be completed before this time and the shoulder be raised more or less from the surface of the member to which the pin is secured, as is the case when the head is welded to the rod shown in Figs. 6 and 7 or to a plate or flat surface as illustrated in Fig. 4.

In the form illustrated in Figs. 4 and 5 the pin 2 is welded to the surface of a plate 6 in a similar manner to that previously described, the bur being taken up by the space between the rounded head 3 and the surface of the plate 6.

In Figs. 6 and 7 the pin is shown as to be welded to a rod 7, the bur after welding being all located back of the shoulder on the pin, whereby a clean, square bearing surface is provided against which parts which are to be fastened to the rod 7 may squarely seat.

This application is a division of my application for patent filed June 16th 1910, Serial Number 567,152.

What I claim as my invention is:—

1. Composite metal work comprising a metallic body and a laterally projecting pin having a head of larger diameter than the pin, said pin being welded to said body by said head.

2. Composite metal work comprising a metallic body and a laterally projecting pin having a head and a substantially square shoulder at the junction of said head and said pin, said pin being welded to said body by said head.

3. Composite metal work comprising two members, one of said members having a rounded head of larger diameter than the body and a square shoulder, said headed member being welded laterally to the other member by the rounded surface of said head whereby a smooth square shoulder is presented at the junction of the two members.

4. Composite metal work comprising a tubular length of metal and a laterally projecting pin provided with a head and a substantially square shoulder at the junction of the pin and head, said pin being welded to said tubular member by said head.

5. Composite metal work comprising two members, one of said members having a rounded head of larger diameter than the body portion, the head being welded to the surface of the other member.

6. Composite metal work comprising a member having a curved surface and a second member having a head of larger diameter than the body portion, the head being welded to the curved surface of the first-named member.

7. Composite metal work comprising a member having a curved surface and a headed shank having a head of larger diameter than the shank and a substantially square shoulder connecting the head and the shank, said head being welded to the curved surface of said first-named member.

Signed at New York in the county of New York and State of New York this 24th day of November A. D. 1913.

LAURENCE S. LACHMAN.

Witnesses:
F. B. TOWNSEND,
HENRY A. GENS.